(12) United States Patent
Yoshino et al.

(10) Patent No.: US 10,879,538 B2
(45) Date of Patent: Dec. 29, 2020

(54) OXYGEN EVOLUTION CATALYST

(71) Applicants: KABUSHIKI KAISHA TOYOTA CHUO KENKYUSHO, Nagakute (JP); TOYOTA JIDOSHA KABUSHIKI KAISHA, Toyota (JP)

(72) Inventors: Shuhei Yoshino, Nagakute (JP); Kensaku Kodama, Nagakute (JP); Yoshio Sageshima, Nagakute (JP); Keiichiro Oishi, Nagakute (JP); Yoriko Hasegawa, Nagakute (JP); Noriyuki Kitao, Susono (JP)

(73) Assignees: KABUSHIKI KAISHA TOYOTA CHUO KENKYUSHO, Nagakute (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 51 days.

(21) Appl. No.: 16/262,197

(22) Filed: Jan. 30, 2019

(65) Prior Publication Data
US 2019/0245212 A1 Aug. 8, 2019

(30) Foreign Application Priority Data

Feb. 7, 2018 (JP) .................................. 2018-019730
Dec. 26, 2018 (JP) .................................. 2018-242435

(51) Int. Cl.
*H01M 4/86* (2006.01)
*H01M 4/92* (2006.01)
(Continued)

(52) U.S. Cl.
CPC ............. *H01M 4/8657* (2013.01); *C25B 1/04* (2013.01); *C25B 11/0484* (2013.01); (Continued)

(58) Field of Classification Search
None
See application file for complete search history.

(56) References Cited

U.S. PATENT DOCUMENTS

| | | | |
|---|---|---|---|
| RE45,703 E * | 9/2015 | Zhu | ..................... H01M 8/0234 |
| 2011/0223096 A1 * | 9/2011 | Wolf | ..................... B01J 23/462 |
| | | | 423/507 |

(Continued)

FOREIGN PATENT DOCUMENTS

| | | |
|---|---|---|
| JP | S62-501823 A | 7/1987 |
| JP | 2003-508877 A | 3/2003 |

(Continued)

OTHER PUBLICATIONS

Mar. 31, 2020 Office Action issued in Japanese Patent Application No. 2018-242435.

*Primary Examiner* — Scott J. Chmielecki
(74) *Attorney, Agent, or Firm* — Oliff PLC

(57) ABSTRACT

An oxygen evolution catalyst includes a core and a shell covering the surface of the core. The core includes ruthenium oxide or metal ruthenium in at least a surface portion. The shell includes titania or a composite oxide of titanium and ruthenium. Such an oxygen evolution catalyst is obtained by (a) dispersing core particles each including ruthenium oxide or metal ruthenium in at least a surface portion in a solvent to obtain a dispersion, (b) adding a Ti source to the dispersion to produce precursor particles in which the surface of each core particle is covered with a titania precursor, and (c) collecting the precursor particles from the dispersion and heat-treating the precursor particles after drying.

4 Claims, 6 Drawing Sheets

(51) Int. Cl.
*H01M 4/90* (2006.01)
*C25B 11/04* (2006.01)
*C25B 1/04* (2006.01)

(52) U.S. Cl.
CPC ....... *H01M 4/9016* (2013.01); *H01M 4/9041* (2013.01); *H01M 4/923* (2013.01)

(56) References Cited

U.S. PATENT DOCUMENTS

| | | | | |
|---|---|---|---|---|
| 2012/0318748 | A1* | 12/2012 | Carlson | C02F 1/4674 210/748.2 |
| 2013/0199923 | A1* | 8/2013 | Kang | B01J 23/462 204/157.52 |
| 2015/0072852 | A1* | 3/2015 | Alibabaei | C25B 1/003 502/1 |
| 2015/0221953 | A1* | 8/2015 | Ramani | H01M 4/9075 429/524 |
| 2015/0221955 | A1* | 8/2015 | Dale | H01M 4/8652 429/524 |
| 2019/0105638 | A1* | 4/2019 | Lu | B01J 23/892 |
| 2020/0131435 | A1* | 4/2020 | Pousthomis | C09K 11/02 |

FOREIGN PATENT DOCUMENTS

| | | | |
|---|---|---|---|
| JP | 2007-514520 | A | 6/2007 |
| JP | 5199575 | B2 | 5/2013 |
| JP | 6174039 | B2 | 8/2017 |

* cited by examiner

OXYGEN EVOLUTION CATALYST

FIELD OF THE INVENTION

The present invention relates to an oxygen evolution catalyst, and more particularly to an oxygen evolution catalyst usable in an oxygen electrode of a water electrolyzer and an anode of a fuel cell.

BACKGROUND OF THE INVENTION

As a material exhibiting oxygen evolution reaction (OER) activity, ruthenium oxide, iridium oxide, etc. are known. Such a material exhibiting OER activity is utilized as (a) a catalyst on the oxygen electrode side of a water electrolyzer, and (b) a catalyst for suppressing oxidation of a carbon material occurring at an anode of a unit cell to which fuel supply has been stopped (a fuel-deficient cell) when power generation is continued in a state where fuel supply to a part of the unit cells in the fuel cell stack is stopped.

Iridium oxide, among others, is high in the durability of OER activity compared to other materials, and thus is often used as an oxygen evolution catalyst. However, iridium oxide is low in initial activity and is costly.

By contrast, ruthenium oxide is less costly and is high in initial activity compared to iridium oxide, but has a problem of being low in the durability of OER activity.

To solve the above problem, various proposals have been conventionally made.

For example, Patent Literature 1 discloses a manufacturing method of an $IrO_2/TiO_2$ catalyst, including:

(a) adding a hexachloroiridate ($H_2IrCl_6$) solution to a suspension of $TiO_2$ (BET>300 $m^2/g$) and heating the suspension to 70° C.;

(b) isolating a product by filtration; and (c) calcining the product at 400° C.

The Document Describes that:

(A) by the above method, a catalyst in which particles of iridium oxide ($IrO_2$) are finely deposited on an inorganic oxide material ($TiO_2$) is obtained;

(B) while particles will easily aggregate if iridium oxide alone is used, aggregation of iridium oxide is suppressed and the high specific surface area is maintained even after heat treatment when iridium oxide is deposited on an inorganic oxide material having a high specific surface area; and (C) as a result, an $IrO_2/TiO_2$ catalyst becomes low in initial potential for oxygen evolution (i.e., high in OER activity) compared to an $IrO_2$ catalyst.

Patent Literature 1 describes that, with fine $IrO_2$ particles supported on the $TiO_2$ surface, reduction in OER activity (aggregation of $IrO_2$) is suppressed.

However, the catalyst described in this document is not configured to protect the catalyst surface at which catalyst degradation starts, and thus does not resolve the problem of durability. Also, since $IrO_2$ is used as the catalyst, the cost is high.

CITATION LIST

Patent Literature

Patent Literature 1: Japanese Unexamined Patent Application Publication (Translation of PCT Application) No. 2007-514520

SUMMARY OF THE INVENTION

An object of the present invention is to provide an oxygen evolution catalyst that has initial activity and durability equal to or higher than iridium oxide and is less costly than iridium oxide.

In order to attain the above objective, the oxygen evolution catalyst of the present invention includes:

a core; and a shell covering the surface of the core, wherein the core includes ruthenium oxide or metal ruthenium in at least a surface portion, and the shell includes titania or a composite oxide of titanium and ruthenium.

The oxygen evolution catalyst of the present invention exhibits initial activity and durability equal to or higher than the conventional catalyst using iridium oxide. This is considered because, by covering the surface of the core including ruthenium oxide or metal ruthenium with the shell including titania or a composite oxide of titanium and ruthenium, the catalyst surface at which catalyst degradation starts is protected. Moreover, the oxygen evolution catalyst of the present invention, which has ruthenium oxide or metal ruthenium as a main ingredient, is less costly than the conventional catalyst having iridium oxide as a main ingredient.

DETAILED DESCRIPTION OF PREFERRED EMBODIMENT

Figure 1:
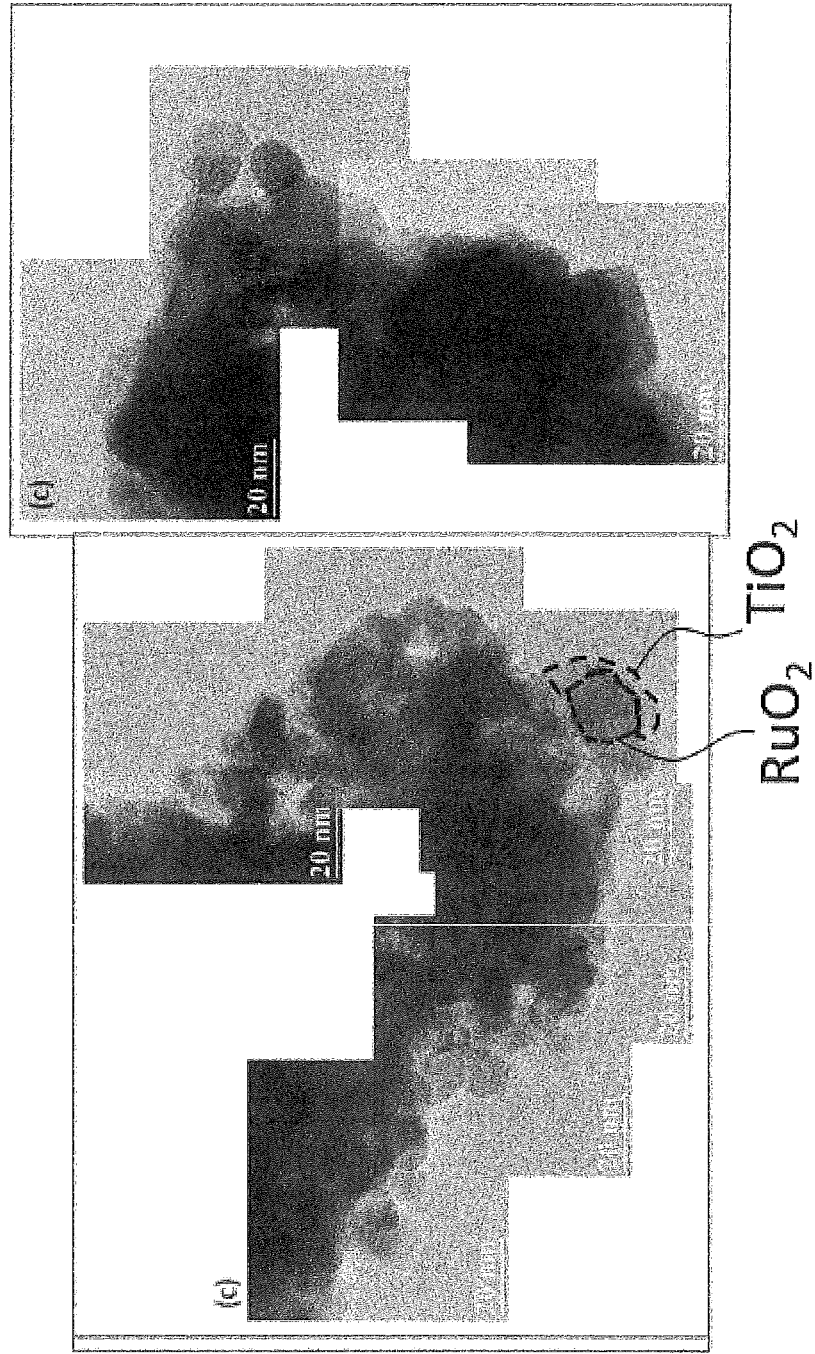
FIG. 1 is TEM images of oxygen evolution catalysts obtained in Example 1 and Comparative Example 1.

Hereinafter, an embodiment of the present invention will be described in detail.

1. Oxygen Evolution Catalyst

The oxygen evolution catalyst of the present invention includes:

a core; and a shell covering the surface of the core, wherein the core includes ruthenium oxide or metal ruthenium in at least a surface portion, and the shell includes titania or a composite oxide of titanium and ruthenium.

1.1. Core

The core includes ruthenium oxide ($RuO_2$) or metal ruthenium (Ru) in at least a surface portion. The ruthenium oxide or metal ruthenium may be included in only a surface portion of the core, or included in the entire core. The surface of the core is preferably substantially made of only ruthenium oxide or metal ruthenium, but may include unavoidable impurities. Since the center of the core does not so much contribute to the oxygen evolution reaction, it does not necessarily need to be made of ruthenium oxide or metal ruthenium, but may be made of another material.

The particle size of the core is not specifically limited. In general, as the core particle size is smaller, a higher effect is obtained with a small amount of addition. On account of this, the average particle size of the core is preferably 1 µm or less, more preferably 500 nm or less, further more preferably 200 nm or less.

1.2. Shell

The shell includes titania ($TiO_2$) or a composite oxide of titanium and ruthenium (($Ti,Ru)O_2$). As will be described later, the shell is formed by coating the core with a titania precursor and firing the precursor. At this time, the ruthenium oxide or metal ruthenium in the surface portion of the core may react with the titania precursor, forming a composite oxide. The shell is preferably substantially made of titania or a composite oxide, but may include unavoidable impurities.

The shell covering the surface of the core is not specifically limited as far as it does not block the OER activity of ruthenium oxide or metal ruthenium and also can improve the durability of ruthenium oxide or metal ruthenium.

1.3. Titania Coverage

The "titania coverage" refers to the number of titania atomic layers on the assumption that all of titanium included in the shell has become titania ($TiO_2$) and that the titania uniformly covers the surface of the core. One atomic layer of titania is represented by "1 ML." Concretely, "1 ML" is defined as the state where the surface atom density of $TiO_2$ (the total number of Ti and O atoms per unit area) is $1.5 \times 10^{15}$ cm$^{-2}$.

As the titania coverage is smaller, the durability of the oxygen evolution catalyst is lower. To obtain a degree of durability equal to or higher than that of iridium oxide, a titania coverage is preferably 0.05 ML or more. The titania coverage is more preferably 0.1 ML or more.

Meanwhile, titania itself has no OER activity. Therefore, if the titania coverage is excessively large, resistance against diffusion of water to the core surface and diffusion of oxygen from the core surface will increase, whereby the OER activity will decrease. In consideration of this, a titania coverage is preferably 5.0 ML or less. The titania coverage is more preferably 0.5 ML or less.

1.4. Usage

The oxygen evolution catalyst of the present invention can be used as (a) a catalyst used in an oxygen electrode of a water electrolyzer, (b) a catalyst added to an anode of a fuel cell (catalyst for suppressing oxidation of a carbon material occurring at an anode of a fuel-deficient cell), etc.

2. Manufacturing Method of Oxygen Evolution Catalyst

The oxygen evolution catalyst of the present invention can be produced by a so-called sol-gel method.

2.1. Production of Dispersion

First, core particles including ruthenium oxide or metal ruthenium in at least surface portions are dispersed in a solvent to obtain a dispersion. The solvent may be one that (a) allows the core particles to be dispersed therein, and (b) permits hydrolysis and condensation polymerization of a Ti source (alkoxide) so that the surfaces of the core particles be covered with a titania precursor.

Examples of the solvent include alcohol, water, and a mixed solvent thereof.

The concentration of the core particles in the dispersion is not specifically limited as far as the core particles can be dispersed uniformly in the solvent.

2.2. Addition of Ti Source

Thereafter, a Ti source is added to the dispersion. With addition of the Ti source to the dispersion, hydrolysis and condensation polymerization of the Ti source proceed in the dispersion. As a result, precursor particles in which the surface of each core particle is covered with a titania precursor are obtained.

Examples of the Ti source include titanium tetraisopropoxide and titanium tetrabutoxide.

As the amount of the Ti source added to the dispersion, an optimum amount is selected according to the target composition.

2.3. Heat Treatment

The precursor particles are collected from the dispersion, dried, and then heat-treated. In this way, obtained is an oxygen evolution catalyst in which the surface of each core particle is covered with a shell made of titania or a composite oxide of titanium and ruthenium.

The heat treatment is performed for dehydrating and crystalizing a titania precursor in which the OH group remains. The conditions of the heat treatment are not specifically limited as far as the titania precursor can be dehydrated and crystallized. In general, heat treatment at 300° C. to 800° C. for approximately 0.5 to 3 hours in the atmosphere is preferred.

3. Effect

Ruthenium oxide and metal ruthenium are less costly compared to iridium oxide and are high in initial activity. However, ruthenium oxide and metal ruthenium are low in the durability of OER activity.

In spite of the above, the oxygen evolution catalyst of the present invention exhibits initial activity and durability equal to or higher than the conventional catalyst using iridium oxide. This is considered because, by covering the surface of the core including ruthenium oxide or metal ruthenium with the shell including titania or a composite oxide of titanium and ruthenium, the catalyst surface at which catalyst degradation starts is protected. Further, the oxygen evolution catalyst of the present invention, which has ruthenium oxide or metal ruthenium as a main ingredient, is less costly than the conventional catalyst having iridium oxide as a main ingredient.

EXAMPLES

Example 1 and Comparative Examples 1 to 3

1. Production of Specimens

1.1. Example 1

A commercially available ruthenium oxide catalyst, 0.3 g, was dispersed in 50 mL of a solvent (isopropanol 80% and water 20%). Titanium tetraisopropoxide (TTIP), 0.6 mL, was added to the dispersion, and the dispersion was agitated for 4 hours. After the agitation, the dispersion was filtrated to collect a catalyst precursor, which was then dried. Further, the catalyst precursor was heat-treated at 400° C. for 1 hour in the air atmosphere, to obtain an oxygen evolution catalyst. The added amount of TTIP in Example 1 is equivalent to five titania atomic layers formed on the surface of ruthenium oxide. Hereinafter, Example 1 is also referred to as "5 ML" using the unit of ML (mono layer).

1.2. Comparative Examples 1 to 3

The commercially available ruthenium oxide catalyst was heat-treated at 400° C. for 1 hour in the air atmosphere as it was without modification with titania (Comparative Example 1) Also, the commercially available ruthenium oxide catalyst without heat treatment (Comparative Example 2) and a commercially available iridium catalyst as it was (Comparative Example 3) were subjected to testing.

2. Test Method

2.1. TEM Observation and EDX Mapping

TEM observation and EDX mapping were performed for the catalysts of Example 1 and Comparative Examples 1 to 3.

2.2. Activity and Durability Evaluation

Each of the catalysts of Example 1 and Comparative Examples 1 to 3 was applied to a gold disk and dried. Using this as the working electrode, electrochemical measurement was performed. Note that the catalyst support amount was unified to 15 gcm$^2$ for all cases. In Example 1, the "catalyst support amount" refers to the amount excluding titania. A reversible hydrogen electrode was used as the reference electrode, platinum was used as the counter electrode, and perchloric acid (0.1 M) was used as the electrolytic solution.

The measurement steps are as follows:
(a) first, one cycle of potential scanning of 1.0 V↔1.6 V was performed,
(b) then, one cycle of potential scanning of 1.0 V↔1.7 V was performed, and
(c) further, 20 to 50 cycles of potential scanning of 0.07 V↔1.8 V were performed.

3. Results

3.1. TEM Observation and EDX Mapping

FIG. 1 shows TEM images of the oxygen evolution catalysts obtained in Example 1 and Comparative Example 1. As a whole, particles in Example 1 appear rounder than those in Comparative Example 1. Also, in detailed observation of the TEM image in Example 1, a ruthenium oxide particle (region encircled by a broken line in FIG. 1) appears covered with an amorphous substance (region encircled by a broken line in FIG. 1).

Figure 2:
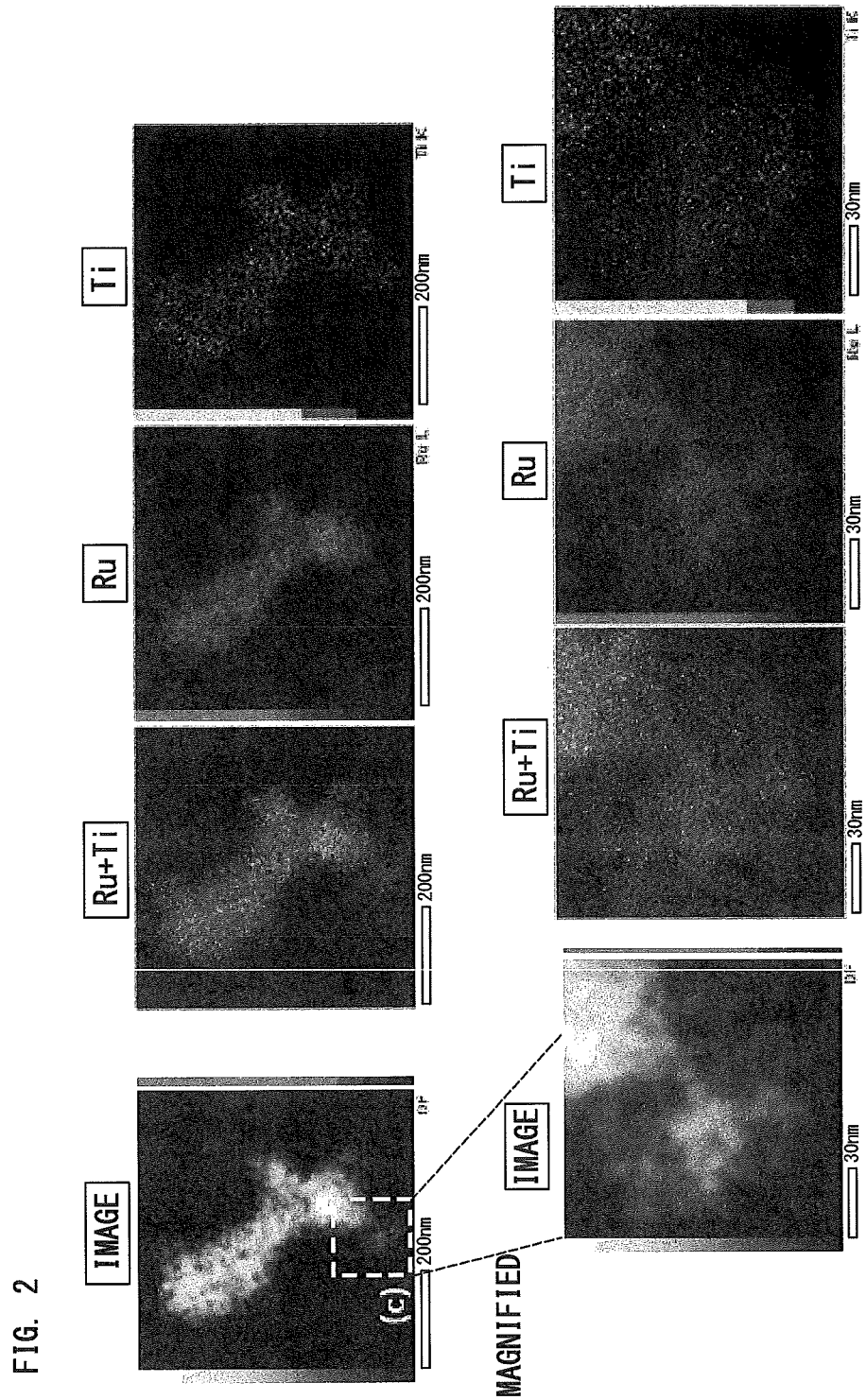
FIG. 2 is EDX mapping of the oxygen evolution catalyst obtained in Example 1.

FIG. 2 shows EDX mapping of the oxygen evolution catalyst obtained in Example 1. The distributions of Ru and Ti roughly coincide with each other. It is therefore considered that titania covers the entire surfaces of the ruthenium oxide particles.

3.2. Activity and Durability Evaluation

3.2.1. Initial Activity

Figure 3:
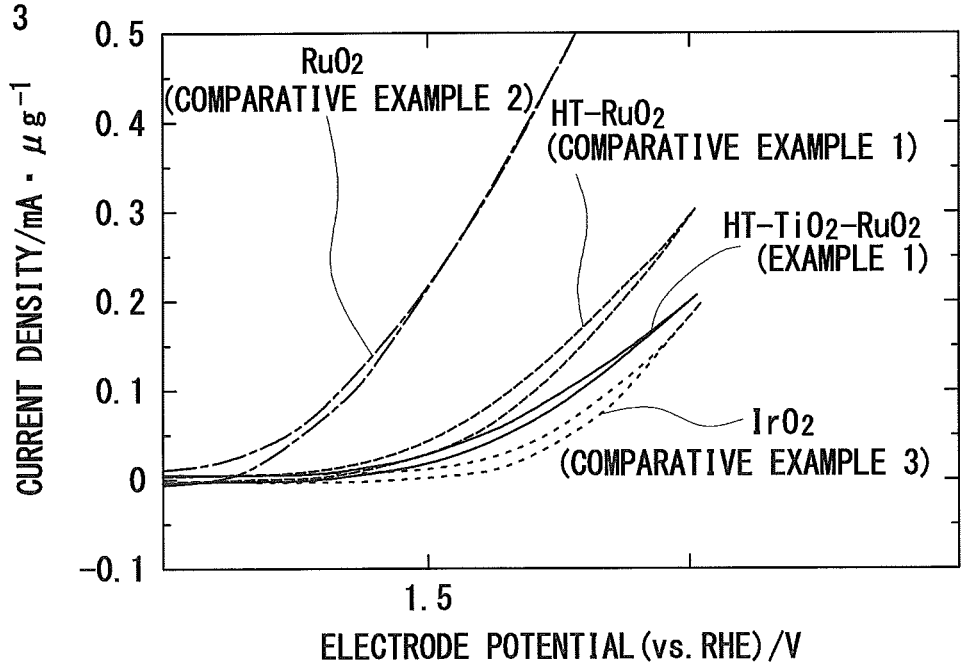
FIG. 3 is the initial water electrolytic activities of oxygen evolution catalysts obtained in Example 1 and Comparative Examples 1 to 3.

FIG. 3 shows the initial water electrolytic activities (water electrolytic activities obtained in measurement step (a)) of the oxygen evolution catalysts obtained in Example 1 and Comparative Examples 1 to 3. The initial activities were higher in the order of the untreated ruthenium oxide ($RuO_2$, Comparative Example 2)>the unmodified, heat-treated ruthenium oxide (HT-$RuO_2$, Comparative Example 1)>the titania-modified ruthenium oxide (HT-$TiO_2$—$RuO_2$, Example 1)>$IrO_2$ (Comparative Example 3). From FIG. 3, it is found that HT-$TiO_2$—$RuO_2$ is lower in activity than $RuO_2$ and HT-$RuO_2$ but higher than $IrO_2$.

3.2.2. Durability

Figure 4:
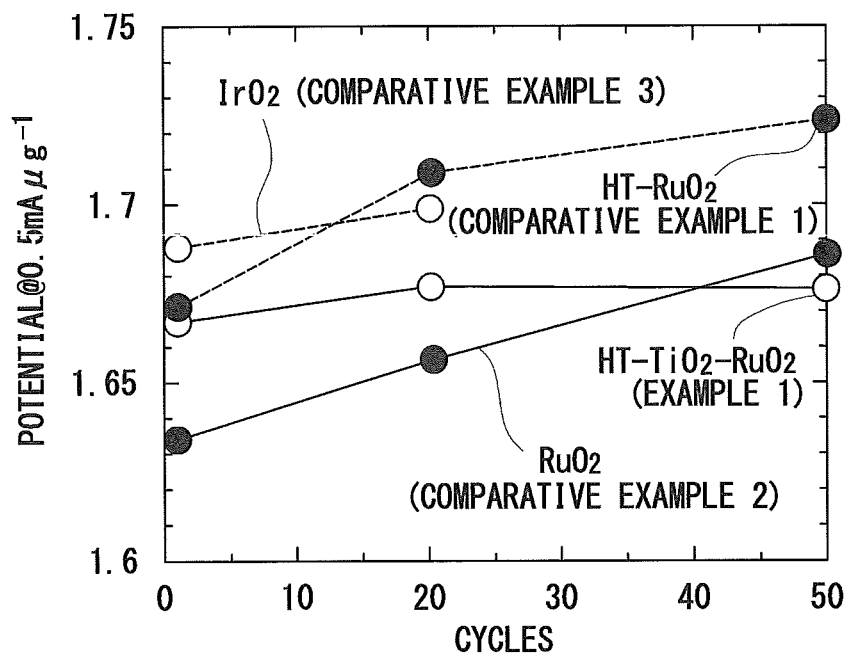
FIG. 4 is activity changes of the oxygen evolution catalysts obtained in Example 1 and Comparative Examples 1 to 3 during potential cycles (0.07 V↔1.8 V)

FIG. 4 shows activity changes of the oxygen evolution catalysts obtained in Example 1 and Comparative Examples 1 to 3 during potential cycles (0.07 V↔1.8 V). In FIG. 4, the "potential @ 0.5 mAμg$^{-1}$" of the vertical axis represents the potential at the time when the current density reaches 0.5 mAμg$^{-1}$ in the course of increase of the potential from 0.07 V. It indicates that the OER activity is higher as the "potential @0.5 mAμg$^{-1}$" is smaller. The values in the first cycle in FIG. 4 represent the potentials at the time when the current density reaches 0.5 mAμg$^{-1}$ in the first cycle in measurement step (c) after measurement steps (a) and (b) have been performed.

In FIG. 3, the activity of HT-$RuO_2$ (Comparative Example 1) was greater than that of HT-$TiO_2$—$RuO_2$ (Example 1). However, the activity of Example 1 in the first cycle in FIG. 4 was roughly equal to that of Comparative Example 1. This is because degradation was already advancing in measurement steps (a) and (b) to such a degree that both catalyst activities became roughly equal at the start point of measurement step (c). From FIG. 4, it is found that, while the activity has decreased (the catalyst has been degraded) during the cycles for HT-$RuO_2$ (Comparative Example 1) and $RuO_2$ (Comparative Example 2), the activity has hardly decreased for Example 1.

Figure 5A:
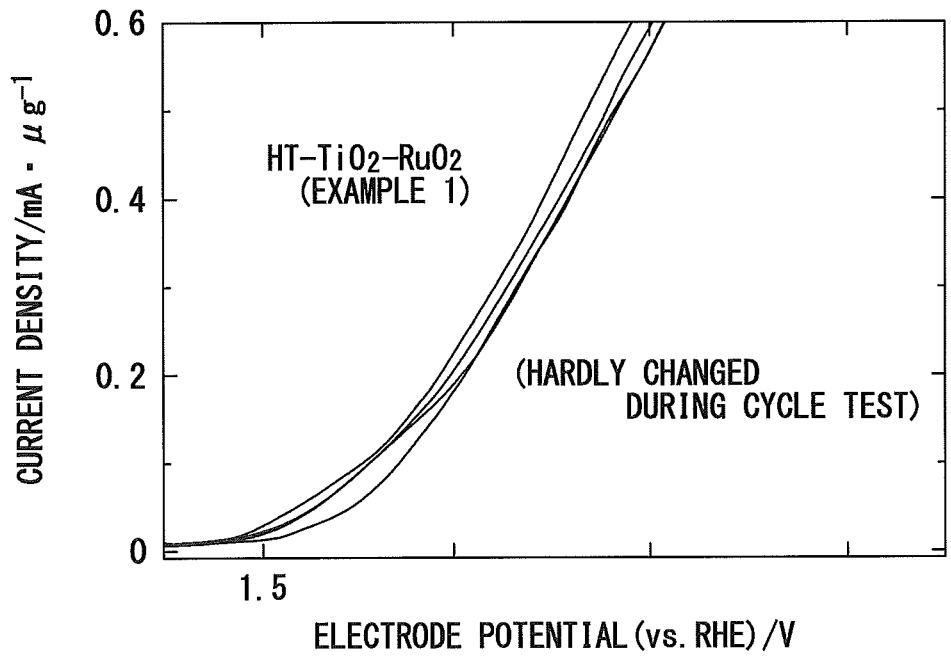
FIG. 5A is changes in the I-V characteristics of the oxygen evolution catalyst obtained in Example 1.
Figure 5B:
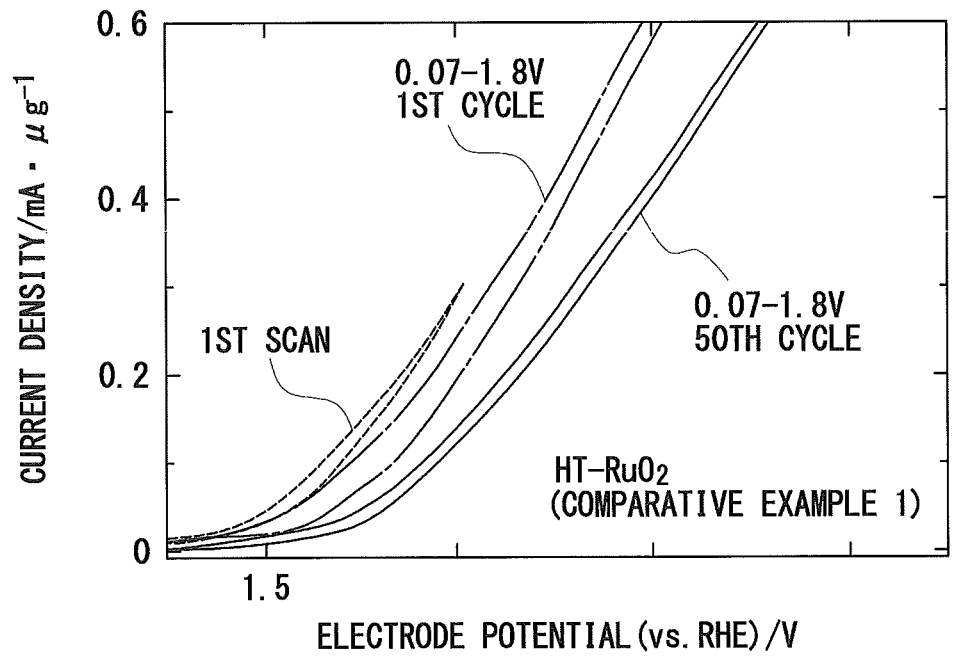
FIG. 5B is changes in the I-V characteristics of the oxygen evolution catalyst obtained in Comparative Example 1.

FIGS. 5A and 5B show changes in the I-V characteristics of the oxygen evolution catalysts obtained in Example 1 (FIG. 5A) and Comparative Example 1 (FIG. 5B). From FIGS. 5A and 5B, it is found that, with modification of ruthenium oxide with titania, the activity does not decrease even when the number of potential cycles increases. Although the initial activity is Comparative Example 1>Example 1, the activity is reversed between them during the cycles. From the above, it is found that, by modifying the surface of ruthenium oxide with titania, an OER catalyst having high activity and high durability can be obtained.

Examples 2 to 5

1. Production of Specimens

Oxygen evolution catalysts were produced as in Example 1 except that the TTIP added amounts were 0.06 mL (equivalent to 0.5 ML, Example 2), 0.03 mL (equivalent to 0.25 ML, Example 3), 0.012 mL (equivalent to 0.1 ML, Example 4), and 0.006 mL (equivalent to 0.05 ML, Example 5).

2. Test Method

The activity and the durability were evaluated as in Example 1. The resultant current values were standardized by the weight of Ru.

3. Results 3.1. Activity Change

Figure 6:
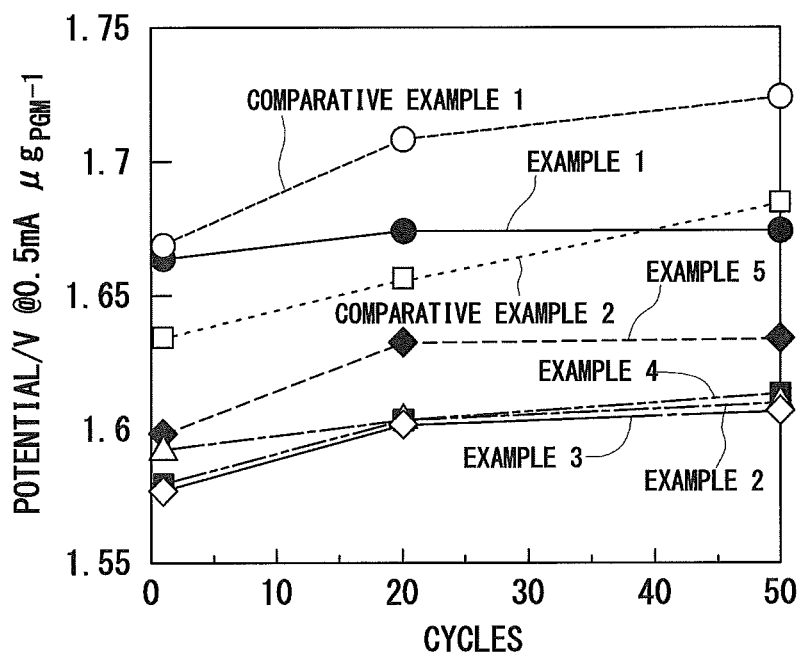
FIG. 6 is activity changes of oxygen evolution catalysts obtained in Examples 1 to 5 and Comparative Examples 1 and 2 during potential cycles (0.07 V↔1.8 V)

FIG. 6 shows activity changes of the oxygen evolution catalysts obtained in Examples 2 to 5 during potential cycles (0.07 V↔1.8 V). In FIG. 6, the results of Example 1 and Comparative Examples 1 and 2 are also shown. In FIG. 6, the vertical axis represents the potential at the time when the current density reaches $0.5$ $mA\mu g^{-1}$, indicating that the OER activity is higher as the value of the vertical axis is lower.

The activity decreased during the cycles for Comparative Example 1 ($HT-RuO_2$) and Comparative Example 2 (commercially available $RuO_2$), and degradation of the catalysts was recognized.

By contrast, the activity hardly decreased for Example 1 (5 ML). For Examples 2 to 5 (0.5 ML to 0.05 ML) in which the coverage was reduced, degradation was observed in one cycle to 20 cycles. However, degradation was hardly observed in 20 cycles to 50 cycles, with the activity higher than Comparative Example 1 even after 50 cycles.

3.2. Coverage Dependence of Activity Change

Figure 7:
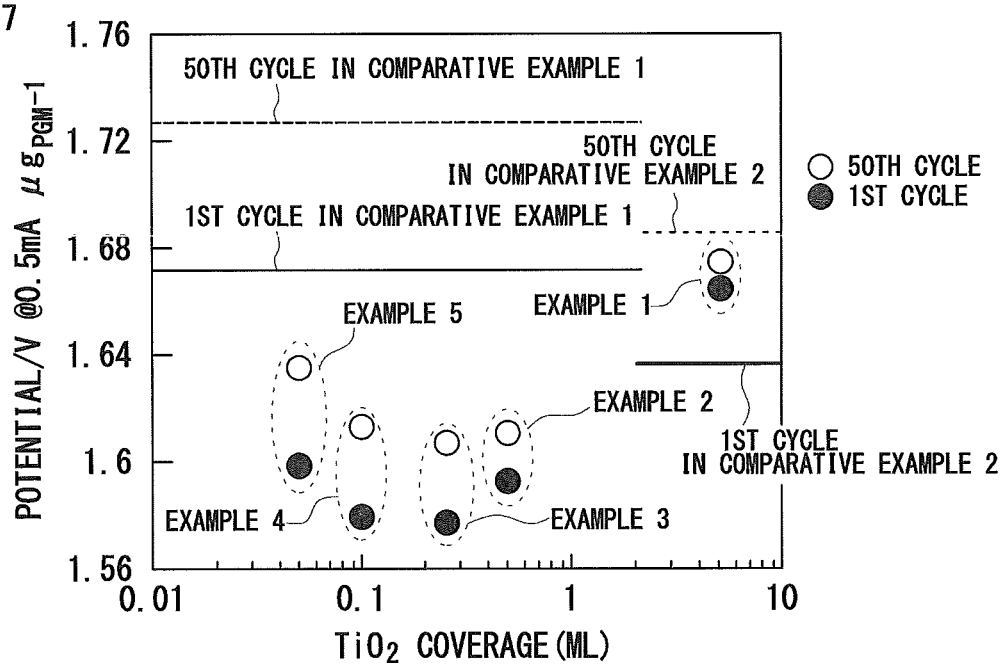
FIG. 7 is the titania coverage dependences of the initial activities and activities after a durability test of the oxygen evolution catalysts obtained in Examples 1 to 5 and Comparative Examples 1 and 2.

FIG. 7 shows the titania coverage dependences of the initial activities and activities after the durability test of the oxygen evolution catalysts obtained in Examples 2 to 5. In FIG. 7, the results of Example 1 and Comparative Examples 1 and 2 are also shown. In FIG. 7, the vertical axis represents the potential at the time when the current density reaches 0.5 $mA\mu g^{-1}$, indicating that the OER activity is higher as the value of the vertical axis is lower. In FIG. 7, the black circles represent the potentials in the first cycle (initial activities), and the white circles represent the potentials in the 50th cycle (activities after the durability test). In FIG. 7, also, the solid lines represent the potentials in the first cycle (initial activities), and the broken lines represent the potentials in the 50th cycle (activities after the durability test), of Comparative Examples 1 and 2.

From FIG. 7, it is found that the initial activities of Examples 1 to 5 are higher than those of Comparative Examples 1 and 2. This also applies to the activities after the durability test. As for the coverage dependence, both the initial activity and the activity after the durability test were maximum when the coverage was 0.25 ML.

3.3. Potential Rise Width

Figure 8:
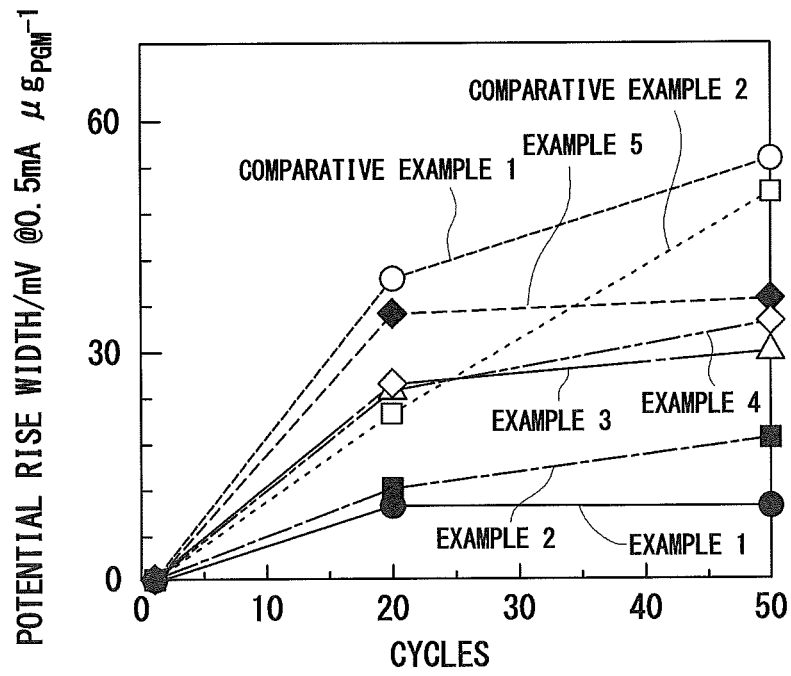
FIG. 8 is potential rise widths observed when potential cycles (0.07 V↔1.8 V) are applied to the oxygen evolution catalysts obtained in Examples 1 to 5 and Comparative Examples 1 and 2.

FIG. 8 shows the potential rise widths observed when potential cycles (0.07 V H↔1.8 V) were applied to the oxygen evolution catalysts obtained in Examples 2 to 5. In FIG. 8, the results of Example 1 and Comparative Examples 1 and 2 are also shown.

The "potential rise width" refers to the potential difference between the first cycle and the N-th cycle. FIG. 8 is a graph obtained by standardizing the values in FIG. 6 as the potential rise widths from the first cycle, indicating the degree of advancement of degradation from the first cycle. FIG. 8 indicates that degradation has advanced as the value of the vertical axis is higher.

From FIG. 8, it is found that the degrees of degradation of Examples 1 to 5 are small compared to those of Comparative Examples 1 and 2. Also, from FIGS. 7 and 8, it is found that, in Examples 1 to 5, in addition to that the OER activity itself is high, degradation does not easily advance, compared to Comparative Examples 1 and 2.

3.4. Titania Coverage Dependence of Potential Rise Width

Figure 9:
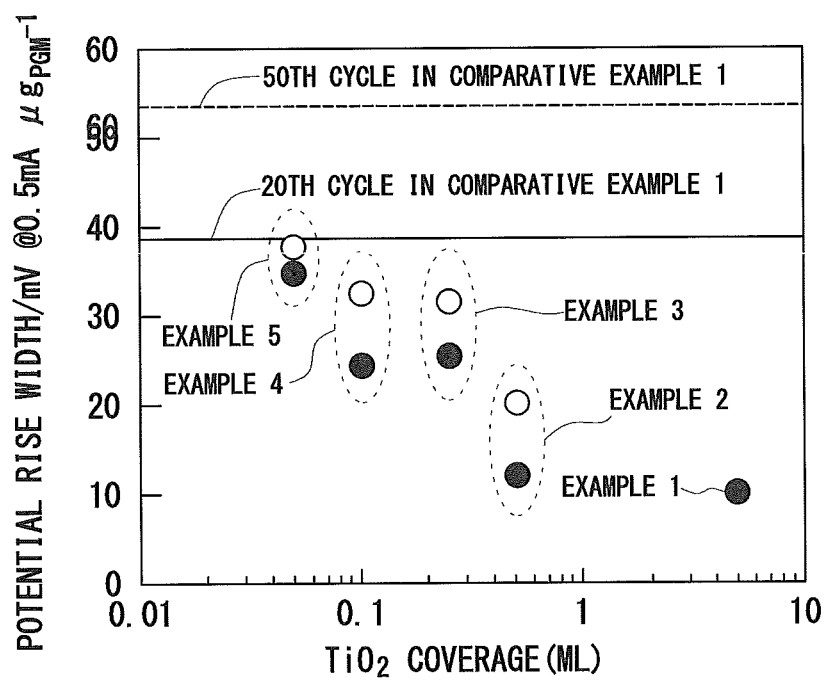
FIG. 9 is the titania coverage dependences of the potential rise widths observed when potential cycles (0.07 V↔1.8 V) are applied to the oxygen evolution catalysts obtained in Examples 1 to 5 and Comparative Example 1.

FIG. 9 shows the titania coverage dependences of the potential rise widths observed when potential cycles (0.07 V↔1.8 V) were applied to the oxygen evolution catalysts obtained in Examples 2 to 5. In FIG. 9, the results of Example 1 and Comparative Example 1 are also shown. In FIG. 9, the black circles represent the potential differences between the first cycle and the 20th cycle, and the white circles represent the potential differences between the first cycle and the 50th cycle. Also, FIG. 9 indicates that the degradation reducing effect is greater as the value of the vertical axis is lower.

From FIG. 9, it is found that the degradation reducing effect is greater as the titania coverage is greater. Note that, in 5 ML, the black circle and the white circle are shown as coinciding with each other because there was no difference between the potential difference in the 20th cycle and that in the 50th cycle.

3.5. Conclusion

From the above, the effects obtained by covering the surface of the ruthenium-based catalyst with titania are summarized as follows.
(1) The OER activities after the durability test (after 50 repetitions of 0.07 V H↔1.8 V cycle) of Examples 1 to 5 are higher than that of Comparative Example 1 (see FIG. 6).
(2) Both the initial activity and the activity after the durability test are high in Examples 1 to 5 compared to Comparative Example 1. Also, the initial activity and the activity after the durability test are maximum when the coverage is 0.25 ML (see FIG. 7).
(3) The degree of degradation with respect to the number of cycles is smaller in Examples 1 to 5 than in Comparative Examples 1 and 2 (see FIG. 8). Also, the degree of degradation is smaller as the coverage is greater (see FIG. 9).

As described above, it has become possible to obtain an OER catalyst having high activity and high durability by covering the surface of a ruthenium-based catalyst with titania with a coverage of 0.05 ML or more and 5 ML or less as in the present invention. While the durability was higher as the titania coverage was greater, the absolute value of the activity was highest at and around 0.25 ML. It is therefore considered that, while the durability and the activity were higher in all the coverages tested (0.05 ML to 5 ML) than in Comparative Example 1, the optimum coverage is near 0.25 ML.

While a preferred embodiment of the present invention has been described in detail, it is to be understood that the present invention is not limited to the above-described embodiment, but various modifications can be made without departing from the spirit of the present invention.

The oxygen evolution catalyst of the present invention can be used as a catalyst used in an oxygen electrode of a water electrolyzer, a carbon degradation reducing catalyst added to an anode of a fuel cell, etc.

What is claimed is:

1. An oxygen evolution catalyst comprising:
    a core; and
    a shell covering and fixed to a surface of the core,
    wherein the core includes ruthenium oxide or metal ruthenium in at least a surface portion, and
    the shell includes titania or a composite oxide of titanium and ruthenium.

2. The oxygen evolution catalyst according to claim 1, wherein a titania coverage is 0.05 ML or more and 5.0 ML or less,
    the titania coverage being the number of titania atomic layers on the assumption that all of titanium included in the shell has become titania and that the titania uniformly covers the surface of the core.

3. A water electrolyzer comprising an oxygen electrode in which the oxygen evolution catalyst according to claim 1 is contained therein.

4. A fuel cell comprising an anode in which the oxygen evolution catalyst according to claim 1 is added thereto.

* * * * *